United States Patent [19]

Goldschmidt

[11] 4,123,779
[45] Oct. 31, 1978

[54] TURNTABLE ROTATIONAL SPEED AND PHASE CONTROL SYSTEM FOR A VIDEO DISC PLAY/RECORD APPARATUS

[75] Inventor: Arthur M. Goldschmidt, Moorestown, N.J.

[73] Assignee: RCA Corporation, New York, N.Y.

[21] Appl. No.: 777,478

[22] Filed: Mar. 14, 1977

[30] Foreign Application Priority Data

Mar. 19, 1976 [GB] United Kingdom ............... 11105/76

[51] Int. Cl.$^2$ ...................... H04N 5/76; G11B 19/28; G11B 17/00
[52] U.S. Cl. ............................. 358/128; 179/100.1 S; 179/100.4 E; 179/100.3 V; 360/73; 318/314
[58] Field of Search .................. 358/128; 179/100.1 S, 179/100.4 E, 100.4 D, 100.3 V; 360/73, 75, 70; 318/314, 318

[56] References Cited

U.S. PATENT DOCUMENTS

| | | | |
|---|---|---|---|
| 3,017,462 | 1/1962 | Clark | 360/70 |
| 3,582,541 | 6/1971 | Hebb | 360/70 |
| 3,646,259 | 2/1972 | Schuller | 360/73 |
| 3,654,387 | 4/1972 | Louth | 360/70 |
| 3,663,763 | 5/1972 | Trost | 360/70 |
| 3,796,825 | 3/1974 | Redlich | 358/128 |
| 3,934,262 | 1/1976 | Snopko | 358/128 |

*Primary Examiner*—Bernard Konick
*Assistant Examiner*—Alan Faber
*Attorney, Agent, or Firm*—Eugene M. Whitacre; William H. Meagher

[57] ABSTRACT

Video disc play/record apparatus includes a turntable driven by a uni-directional DC motor, a speed loop for controlling motor rotation responsively to horizontal sync signal and a position loop for controlling the rotational phase of the turntable responsively to a frame sync signal. The speed loop comprises a motor driven tachometer whose output is stabilized by a phase locked loop about a nominal frequency. A phase and frequency difference detector, responsive to the phase locked loop output and the horizontal sync signal, provides a driving voltage to power amplifiers coupled to the motor. The position loop includes means cooperating with the speed loop to regulate the turntable phase of rotation responsively to the phase difference between the outputs of a turntable tachometer and a frame and vertical sync signal source. Delay circuits in the speed and position loops provide compensation for detected disc mounting error between a previous recording mounting position and the current mounting position of the disc on the turntable. A by-pass circuit directly powers the motor during start-up operations. Stopping and overspeed protection are accomplished by inhibiting the power amplifiers and coupling a source of reverse potential to the motor.

18 Claims, 5 Drawing Figures

TURNTABLE ROTATIONAL SPEED AND PHASE CONTROL SYSTEM FOR A VIDEO DISC PLAY/RECORD APPARATUS

The present invention relates generally to control systems for a disc play/record apparatus, and particularly to novel and improved systems for control of turntable rotational speed and phase for recording and playback of high-density information records, such as video disc records of the type described in co-pending U.S. application Ser. No. 668,495 — Spong filed Mar. 19, 1976.

In records of the type shown in said Spong application, the light output of a recording beam, which is intensity modulated in accordance with a signal to be recorded, is focused upon the surface of the disc as the disc is rotated. With the peak intensity of the focused light sufficient to cause ablation of an absorptive layer coated over the disc surface, an information track is formed as a succession of pits in the absorptive layer. In playback of such disc records, a light of a constant intensity, insufficient to cause further ablation of the absorptive layer, if focused on the information track. A photodetector, positioned to receive light reflected from the information track which is modulated in intensity by the pits passage through the path of light, develops a signal representative of the recorded information.

Pursuant to the principles of the present invention, the rotational velocity of a motor driven turntable supporting the disc record is controlled by means of a speed loop which synchronizes the speed of the motor with synchronizing information accompanying the information to be recorded and which synchronization information may be available from an external source during information recovery operations (e.g., a sync generator).

In accordance with one feature of the present invention, a novel arrangement for the speed loop includes a motor driven tachometer and a phase locked loop for stabilizing the output of the tachometer about a frequency which is a multiple of the rate of a synchronization signal. Illustratively, for video recordings, the synchronization signal may be the horizontal sync pulse. With the output of the phase locked loop being made independent of short term variations in the output of the tachometer, the overall speed loop stability is enhanced, enabling the satisfactory operation of the system with a relatively inexpensive tachometer. Additionally, the phase locked loop allows for a smooth transformation for a tachometer output bearing no harmonic relationship to the synchronization signal into an output bearing such a relationship. Furthermore, this novel arrangement provides the system with a source of highly stable and accurate timing pulses, representative of increments of a horizontal line for the illustrative video recordings.

In an illustrative implementation of this feature in a speed loop for a video recording, the output of a first detector, responsive to the frequency and phase differences between the output of the phase locked loop and the output of a source of reference horizontal sync signals, is utilized to provide a driving signal for controlling the speed of a turntable motor. This driving signal is applied through a compensation network to power amplifiers which are coupled to the motor input terminals to complete the speed control loop.

In accordance with a further feature of the present invention, an advantageous arrangement for assuring rapid motor acceleration to operating speed by by-passing the speed loop during motor start-up operations, is provided for.

In an illustrative implementation of this feature, one output of the first detector, representative of motor speed, is utilized to control a flip-flop. The output of the initially reset flip-flop provides, through an FET switch, a direct driving signal to the power amplifiers. When the motor speed approaches the desired operating speed the one output of the detector triggers the flip-flop into a set state thereby discontinuing the direct drive signal.

During disc playback, it is further desirable to control disc rotation so that the start of a recorded frame of information will be in phase with available frame synchronization signals. Pursuant to principles of the present invention, the acceleration and deceleration of the motor is adjusted to assure the desired phase relationship between the start of a frame of recorded information and the synchronization frame signal.

In an illustrative implementation of these principles in use for video recordings, a position loop includes a phase tachometer providing an output in response to the rotation of the turntable and means, cooperating with the speed loop for altering the phase of rotation of the turntable. The position loop further includes means for rendering the phase altering means responsive to the phase difference between frame synchronization signals and the output of the phase tachometer. With use of the aforesaid position control loop, initiation of the recording of each frame of video information along a radial line of the disc passing through the particular turntable location is assured. A play/record delay circuit subjects the filtered output of the phase tachometer to a 3 horizontal lines time delay during information recovery operations to advantageously compensate for a corresponding delay in information processing circuitry.

In accordance with an additional feature of the present invention, discrepancies between the original mounting position during a previous recording, of a partially recorded disc and its current mounting position on the turntable are illustratively compensated for by means of two time delay circuits respectively provided in the speed and position loops. The position loop incorporates a delay circuit which subjects the output of the play/record delay circuit to a time delay which varies, in increments of a whole horizontal line, correspondingly to the magnitude of the detected mounting error. The speed loop, on the other hand, incorporates a delay circuit which subjects the output of the phase locked loop to a time delay which varies, in increments of 1/80th of a horizontal line, corresponding to the magnitude of the remaining detected mounting error after error compensation in the position loop.

In accordance with yet another feature of the present invention, a novel arrangement is provided for control of the energization of a relay coupling the power amplifiers and the motor, with a user actuated run/stop switch and a detector for the output of the phase tachometer in an interrelationship that provides fast stop for the motor as well as overspeed protection.

In an illustrative implementation of the aforementioned feature, user activation of a motor stop switch results in the development in logic circuits of signals which inhibit the power amplifiers and which energize the relay to a position where a source of reverse potential is coupled to the motor. These logic circuits are also responsive to an overspeed condition and momentarily effect an energization of the relay.

Figure 1:
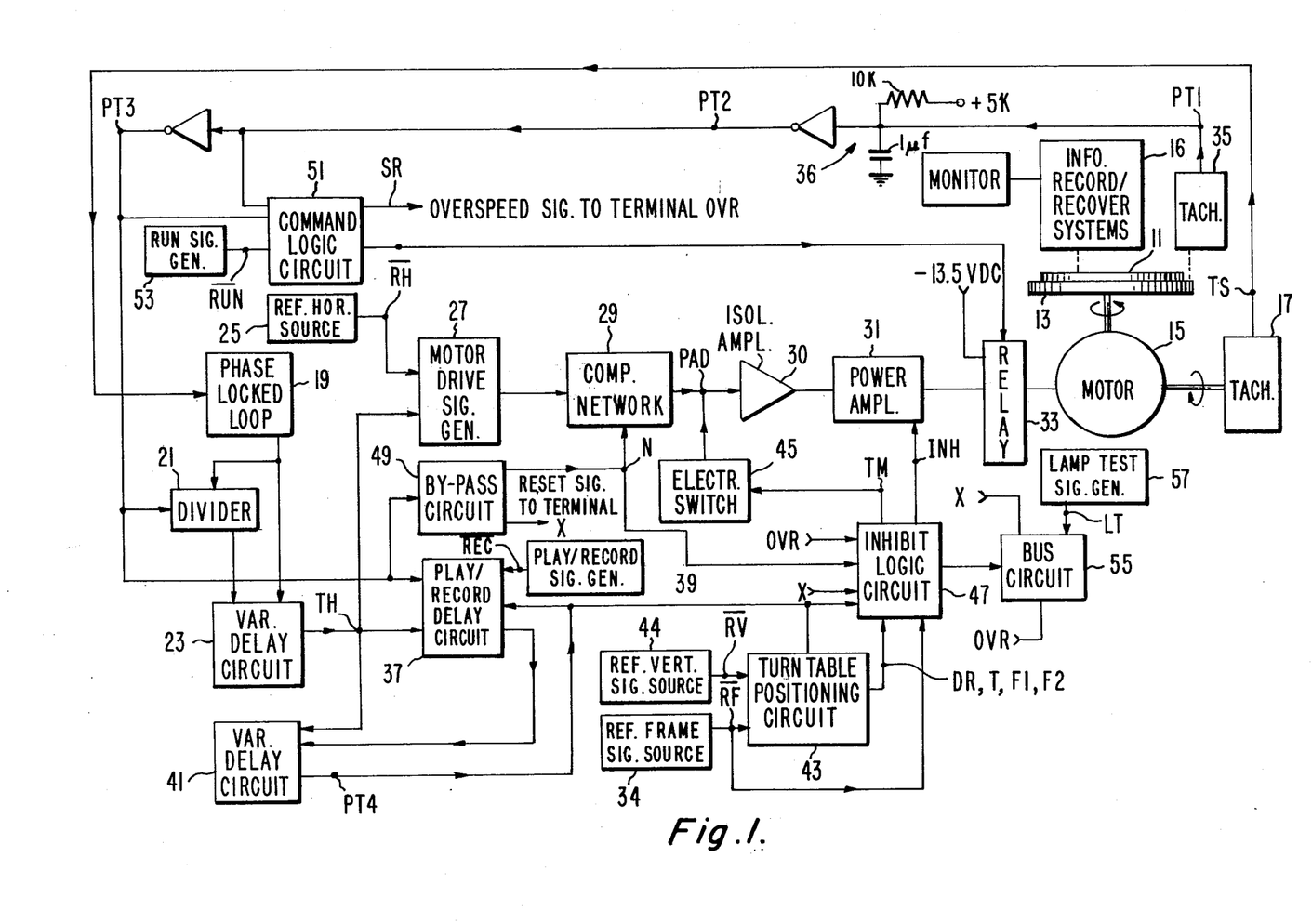
FIG. 1 provides a representation, in block diagram form, of a turntable rotational speed and phase control system in accordance with principles of the present invention.

In FIG. 1, a disc 11 is shown supported on a turntable 13 driven by a uni-directional DC motor 15. Illustratively, a disc 13 may be of a type suitable for effecting information recording in a spiral track or a plurality of circular tracks on a major surface of the disc. By way of example, disc 11 and the associated information recording and recovery system 16 may be of a type suitable for the aforementioned ablative recording methods so that playback of the recorded information may be effected immediately after the recording thereof without need for any intermediate processing steps.

Illustratively, for a recording of video signals conforming to the NTSC standard, the turntable 13 is to be driven at a constant speed so that it may revolve at an approximately once every one-thirtieth of a second rate. Each frame of video information to be recorded may therefore occupy approximately one revolution of the information storage track of the disc 11. For the illustrative NTSC standard, a motor speed loop (type 2 servo) includes a motor driven tachometer 17 which supplies a 2,000 pulse per motor revolution signal (Ts) to a phase locked loop circuit (PLL) 19. The output of the tachometer 17 is processed in the PLL 19 to produce an output signal having a variable frequency falling within a band of frequencies defined between 500 KHz and 2.5 MHz, and which output signal exhibits long-term stability about an examplary frequency of 1.26 MHz in the specific embodiment under consideration. The output of the PLL 19 is applied to a divider circuit 21 so as to be counted down to the horizontal video sweep rate of 15,734.2 Hz.

The counted down PLL 19 output is, in turn, applied to a disc mounting error fine compensation circuit 23, to be subsequently described, which subjects the counted down PLL 19 output to a time delay varying responsively to the magnitude of a detected disc mounting error. The output of the fine compensation circuit 23 and the output of an external source 25 of inverted reference horizontal signals ($\overline{RH}$) (e.g., derived from the composite video signals to be recorded or provided by a sync generator during playback) are respectively applied to two inputs of a motor drive signal generator 27 which produces an output in accordance with the difference in frequency and phase between the two applied signals. The output of the drive signal generator 27 is coupled to a compensation network 29, which provides the speed loop with the desired characteristics for the given type 2 servo. The output of compensation network 29 is applied through an isolation amplifier 30, to power amplifiers 31 which supply, through a relay 33, an energization potential to the motor 15 to thereby close the speed loop.

While the speed loop is satisfactory in maintaining the motor 15 at a desired operational speed, it is further desirable, when the turntable is rotating, to have a particular location on the turntable 13, and hence a corresponding particular location on the disc 11 carried thereon, rotating in phase with a frame synchronization signal (i.e., inverted reference frame signal $\overline{RF}$) available from an external source 34 (e.g., means responsive to the equalizing pulses of the composite video signals during video recording, or a sync generator during playback).

A position loop for controlling the turntable phase of rotation includes a phase tachometer (phase tach) 35 which provides an inverted train of pulses PT1 respectively representative of the procession of a particular turntable location past a stationary position. Illustratively, the phase tach 35 may be a photoelectric detector which is responsive to brightness modulation produced by a marker, carried by the turntable, as it passes through a light path to the detector.

The output of the phase tach 35 is filtered and inverted in a network 36 and subsequently applied through another inverter to a play/record delay circuit 37 which provides a 3 horizontal line delay to the modified (i.e., filtered and twice inverted) phase tach output (PT3) during information recovery operations. The play/record delay circuit 37 is responsive to the output of a user activated play/record command signal ($\overline{REC}$) generator 39, which, illustratively may be a simple two position switch providing a low potential signal during record and a high potential signal during playback. Since during information recording operations the delay is removed, the net effect of the delay imposed during information recovery is a 3 line advance in the particular turntable location relative to the $\overline{RF}$ signal (assuming that sync is established between the modified phase tach signal and the $\overline{RF}$ signal). This advance provides compensation for an equal amount of delay to which the information recovered from the disc 11 is subjected to during processing in information recording and recovery system 16. The output of the play/record delay circuit 37 is applied to a disc mounting error coarse compensation circuit 41 whereat it may be subjected to a time delay varying responsively with the magnitude of the detected disc mounting error.

It may be instructive at this point to describe the operation of the respective disc mounting fine and coarse compensation circuits 23, 41. Basically, when a disc blank, which is partially recorded, is mounted on the turntable 13 for further information recording, it is desirable, for the sake of playback continuity of the recorded information segments, to synchronize the previously recorded frames with the $\overline{RF}$ signal. To achieve this desired synchronized condition, the disc blank 11 is to be positioned on the turntable 13 so that a pre-determined radial segment of the disc is aligned with a predetermined segment on the periphery of the turntable 11. Compensation for a disc mounting error, due to the relatively large mechanical tolerances inherent in the disc positioning process, is electronically provided for by means of the respective fine and coarse compensation circuits 23, 41. The disc mounting error (i.e., the discrepancy between the $\overline{RF}$ signal and the previously recorded frames) is detected during playback of the previously recorded information on a suitable monitor. Fine compensation circuit 23 subjects the counted down PLL 19 output to a time delay in increments of 1/80th of a horizontal line for a possible total delay of ± 0.625 line (i.e., ± 39.6 μsec). Coarse compensation circuit 41, on the other hand, subjects the output of the play/record delay circuit 37 to a time delay in increments of a whole horizontal line for a possible total delay of ± 5 lines (i.e., ± 317 μsec). By proper manipulation of the two delay circuits the disc mounting error may be effectively compensated for.

With reference again to the position loop, the output of the coarse error compensation circuit 41 is applied to a turntable positioning circuit 43 including a detector for comparing that signal with the $\overline{RF}$ signal and an inverted reference vertical sync signal ($\overline{RV}$) provided by an external source 44 (e.g., a sync separator operating on the composite video signal to be recorded or sync generator). The output of the turntable positioning circuit 43 is in accordance with the difference in phase between the output of the coarse error compensation circuit 41 and the $\overline{RF}$ signal, and is utilized to incrementally modify the speed control loop by either driving the power amplifiers 31 through an electronic switch 45 or by inhibiting the power amplifiers 31 by means of another output applied through an inhibit logic circuit 47 which is further employed to prevent additional positioning of the turntable 13 once coincidence between the coarse compensation circuit 41 output (PT4) and the $\overline{RF}$ signal is established. The position loop is completed through relay 33, motor 15 and turntable 13 back to the phase tach 35.

A bypass circuit 49 is employed to provide rapid motor acceleration to operational speed and is removed from the speed control loop, when the motor 15 reaches operational speed, responsively to one output of the drive signal generator 27. Bypass circuit 49 applies a maximum driving potential to the amplifiers 31, through compensation network 29, and isolation amplifier 30, during motor start-up operations while also applying a command signal, to inhibit logic circuit 47 to disable the positioning loop from affecting motor start-up operations.

A command logic circuit 51 detects turntable rotational conditions (i.e., no motion and overspeed) responsively to the output of the phase tach 35. Upon detecting an overspeed condition or absence of a run condition ($\overline{RUN}$) from a generator 53 (e.g., a switch), command logic circuit 51 produces an output which is applied to the inhibit logic circuit 47 to provide an inhibit condition for the power amplifiers 31 and which output is further utilized to energize the relay 33 to a position where a reverse voltage potential (e.g., $-13.5$ VDC) is coupled to the motor 15. To prevent reverse motor rotation, the energization of the relay 13 is ceased upon the detection of a no-motion condition of the turntable.

A bus circuit 55 responsive to outputs of command logic circuit 51, a lamp test signal generator 57 and inhibit logic circuit 47, provides driving voltages to various indicators and user systems external of the speed and position loops.

Figure 2:
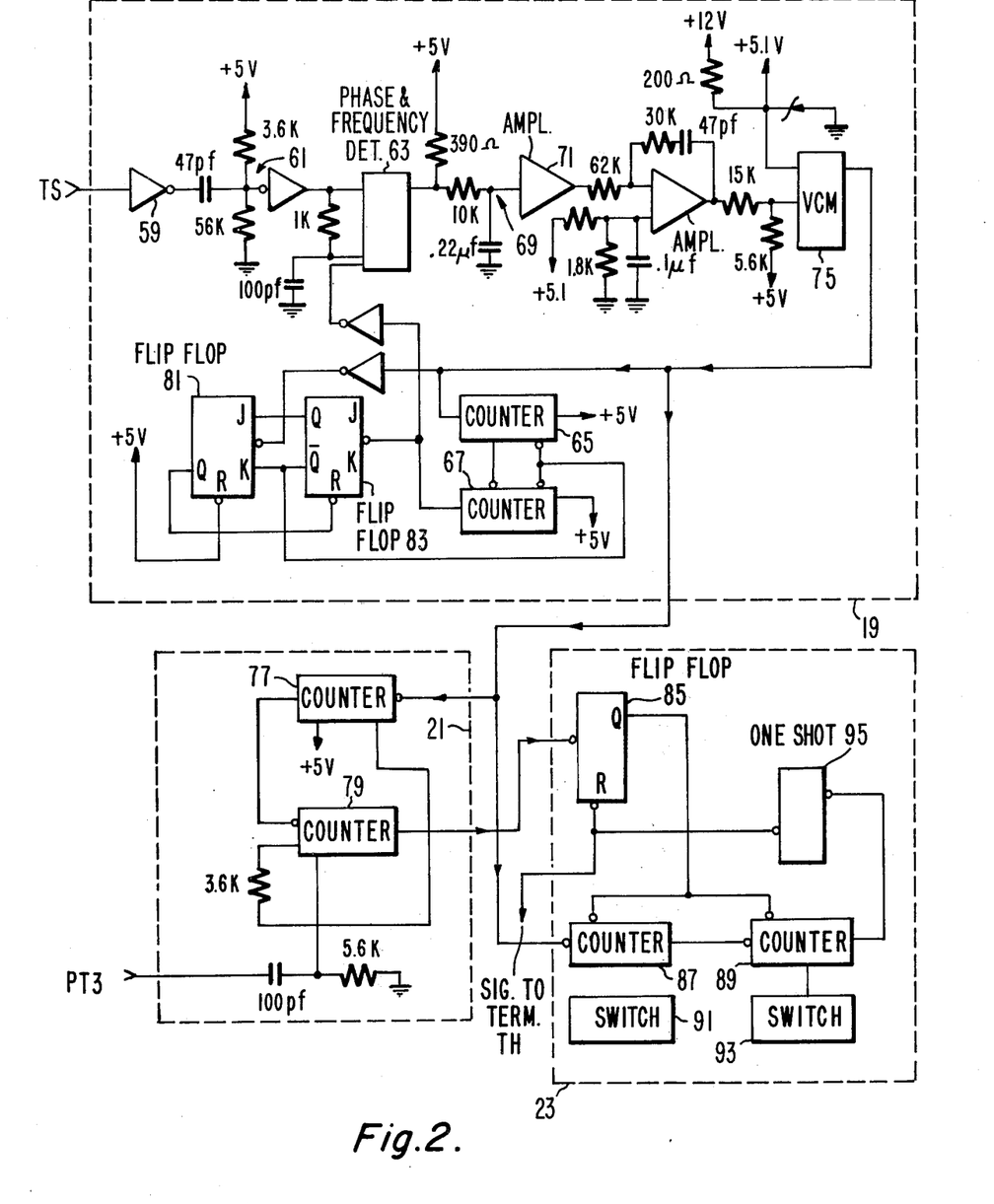
FIGS. 2-5 provide representations, in schematic diagram form showing circuit details of the system of FIG. 1.
Figure 3:
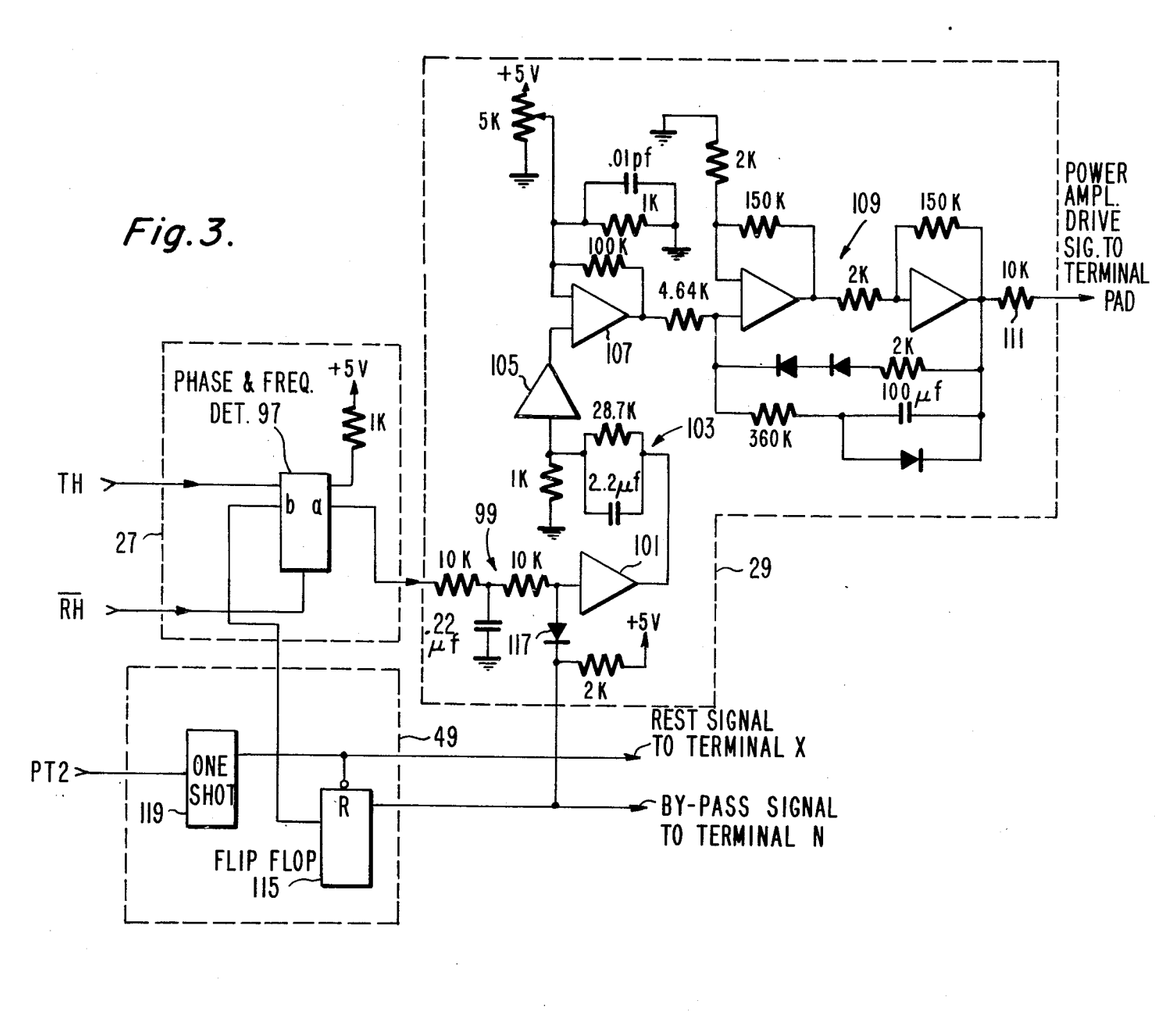
Figure 4:
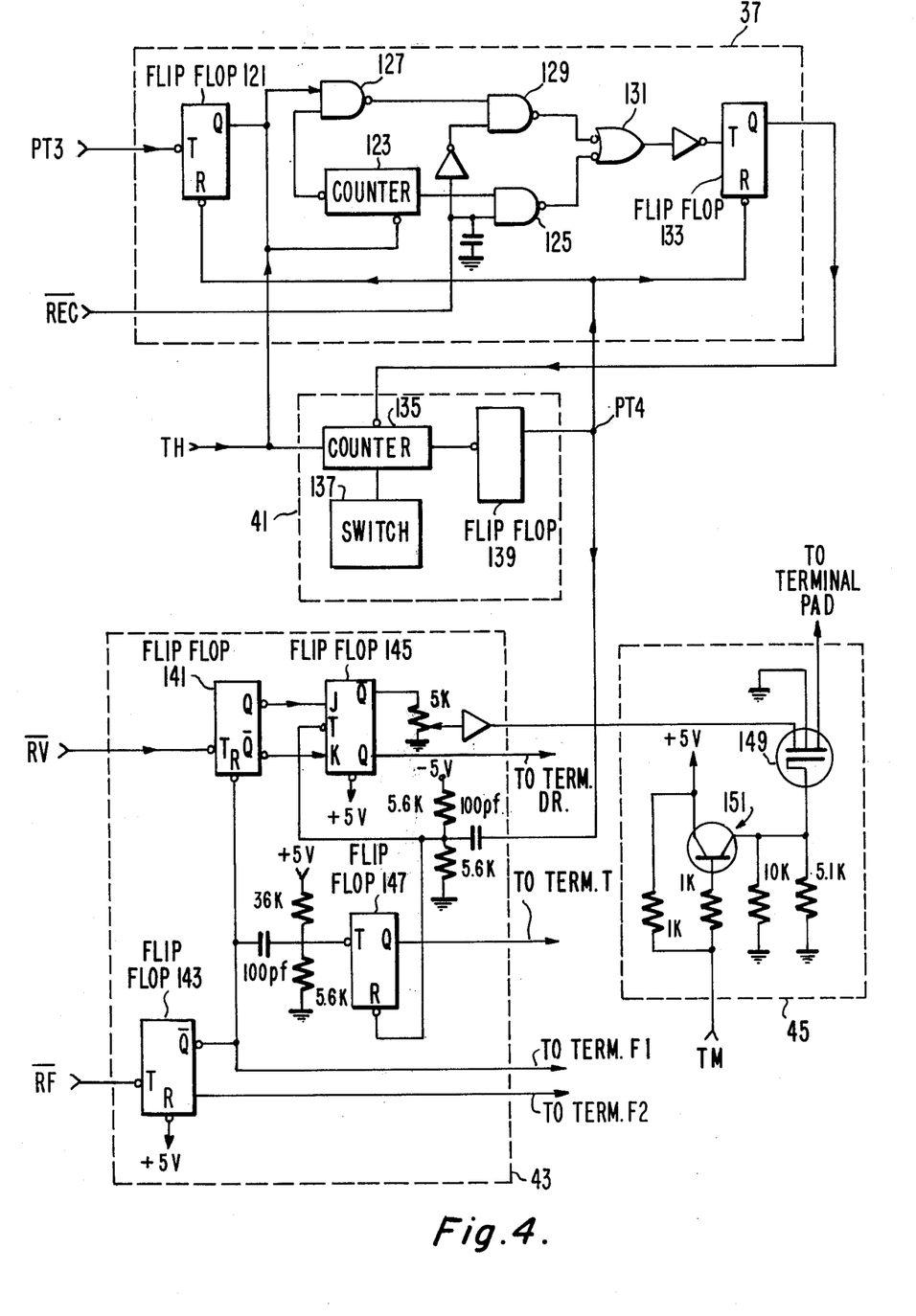

With reference now to the schematic representations of FIGS. 2-4, in FIG. 2, the output of the 2,000 line tachometer 17 (TS) is shown to be applied to an input terminal of an inverter 59 which forms part of the PLL 19. The output of the inverter 59 is fed to an resistive-capacitive differentiator 61 to produce a series of sharply defined pulses still having the frequency and phase characteristics of the output of the 2,000 line tachometer 17. The output of the differentiator 61, is, in turn, applied to both the left shift clock input terminal and, after a slight delay, to the mode control input terminal of a right/left shift register 63. The right shift clock input terminal of register 63 also receives, via a feedback path, including counters of 21 65, 67 a counted down output of the PLL 19. Register 63 operates as a frequency/phase detector and the output thereof is a positive DC voltage (approximately five volts) when the frequency of the 2,000 line tachometer 17 output is lower than the frequency of the counted down PLL 19 output. When the frequency of the 2,000 line tachometer output is higher than the frequency of the counted down PLL 19 output, the output of register 63 is a low voltage potential (approximately zero). When the frequencies of the two input signals to register 63 are equal, the output of the register 63 is a square wave having a duty cycle which varies dependently upon the relative phase of the two inputs and which output ultimately stabilizes at approximately 50 percent duty cycle. The output of register 63 is applied, through a filtering stage 69 in series with a voltage follower 71, to an amplifier and compensation network 73 which provides the gain and loop phase characteristics required. The output of network 73 is attenuated and level shifted to drive a voltage controlled multivibrator (VCM) 75 which provides the PLL 19 output. When the loop is locked at operational motor speed (approximately 1,800 rpm), the frequency of the output of VCM 75 is 1,258,740 Hz. Divider circuit 21, including counters of 80 77, 79 receives the output of PLL 19 and counts it down to horizontal rate. Bistable multivibrators 81, 83, in PLL 19 provide timing pulses and delay to reload counters 65, 67 while the PT3 signal provides timing pulses and delay to reload counters 77, 79.

In fine compensation circuit 23, the output of divider circuit 21 is applied to the trigger terminal of a flip-flop 85 to switch it to a set mode. In the set mode, the output of flip-flop 85 switches a pair of serially coupled counters 87, 89, from a load mode to a count mode, wherein the PLL 19 output is counted from an initial setting preset by respective module mounted thumbwheel switches 91, 93, which may be selectively varied to compensate for the observed disc mounting error. When counters 87, 89 are loaded, one output of counter 89 triggers a one-shot 95 whose output (TH) resets flip-flop 85; this output switches counters 87, 89 to the load mode and the respective count values of switches 91, 93 are reloaded into the counters to begin another count. Therefore, the output of one-shot 95 (TH) will correspond to the counted down PLL 19 output with a given time delay.

In FIG. 3, the output (TH) of the fine compensation circuit 23 is shown applied to one input terminal of a detector 97 included in the drive signal generator 27. Detector 97 also receives as input the $\overline{RH}$ signal and produces an error signal which varies with the frequency and phase difference between the two inputs. Detector 97 develops one output, at a terminal "a" thereof, having a duty cycle which varies in a nonlinear manner when the frequency of the TH signal is less than the frequency of the $\overline{RH}$ signal. This nonlinear variation causes the motor to fail to readily reach operational speed. When the frequency of the TH signal is greater than the frequency of the $\overline{RH}$ signal the output of the detector is a positive DC potential (greater than 2.5V) which output inhibits motor drive. However, when the frequency of the TH signal is equal to the frequency of the $\overline{RH}$ signal the output of the detector 97 is a signal having a duty cycle proportional to the phase difference between the two input signals which output exhibits long term stability at approximately 50% duty cycle.

The output of the detector 97 is coupled to compensation network 29 including a filter stage 99 and an isolation amplifier 101. The output of amplifier 101 is applied through a first compensation stage 103 to a second isolation amplifier 105. The gain of the output of second isolation amplifier 105 is increased in amplifier 107 and is thereafter applied to a second compensation stage 109 providing, along with the first compensation stage 103, an initial 6 db/octave gain slope which changes to 0 db/octave gain slope at approximately the same frequency as the mechanical corner frequency of the motor 15. The output of the second compensation stage 109 is applied through a resistor 111 to the isolation amplifier 30 (not shown).

Bypass circuit 49 includes a flip-flop 115 whose output (N) is coupled, through a blocking diode 117, to the input of isolation amplifier 101. During motor start-up operations, the output of flip-flop 115 goes low, thereby effectively providing a dump path for the output of the detector 97 and therefore applying a maximum drive signal to the compensation network 29. Simultaneously, the low output of flip-flop 115 is applied to inhibit logic current 47 (see FIG. 5) to insure that electronic switch 45 is in a non-conducting stage and that no inhibiting of the amplifiers 31 may occur. Flip-flop 115 is removed from the speed control loop, when the motor 15 is up to operational speed, by means of a varying duty cycle signal developed at terminal "b" of detector 97. This signal sets the output of flip-flop 115 high, thereby applying a reverse bias across the blocking diode and effectively removing the input of isolation amplifier 101 from the output of the flip-flop 115. Reset of flip-flop 115 is by means of a no-motion one-shot 119 which is controlled by the filtered and inverted output (PT2) of the phase tach. The output of one-shot 119 remains high as long as the period of the input PT2 pulse is shorter than the width of the output pulse of the one-shot 119. When the period of the input PT2 pulse is longer than the width of the output pulse, indicative of slow rotation, a so-called no-motion condition, of the turntable, the output changes to a low to reset flip-flop 115.

The turntable positioning loop includes the play/record delay circuit 37, shown schematically in FIG. 4, which receives as input the PT3 signal. This input signal triggers a flip-flop 121 whose output is supplied to two signal paths. The first path being exclusively activated during information recovery operations to provide a 3 horizontal line delay to the PT3 signal. The second path, which provides no delay, being exclusively activated during information recording operations.

The first path comprises a counter 123 which is enabled by the output of flip-flop 121. Counter 123 is incremented by the one-shot 95 output (TH) and provides the needed delay. The output of counter 123 is applied to one input of a NAND gate 125 while the $\overline{REC}$ signal is applied to another input of the NAND gate 125. During information recovery operations the $\overline{REC}$ signal will be high, thereby enabling the gate 125, while during information record operations the $\overline{REC}$ signal will be low leading to a constant high output of the gate 125.

The second path, on the other hand, comprises a first NAND gate 127, one input of which receives the output of flip-flop 121 while the other input receives the TH signal. The output of the first gate 127 is applied to one input of a second NAND gate 129 whose other input is the inverted $\overline{REC}$ signal. During information recording the inverted $\overline{REC}$ signal will be high enabling the second NAND gate 129, while during information recovery operations the inverted $\overline{REC}$ signal will be low leading to a constant high output for the second gate 129.

The outputs of the first and second signal paths (i.e., the outputs of NAND gates 125, 129 respectively), are thereafter combined by being applied to respective input terminals of a negated-input OR gate 131 whose output triggers flip-flop 133. The output of flip-flop 133 switches a counter 135, in the coarse compensation circuit 41, from a load mode to a count mode. Counter 135, provides a time delay by counting the TH signal from an initial setting preset by a module thumbwheel switch 137 whose initial setting may be selectively varied to thereby compensate for an observed disc mounting error. At the end of the count, the output of counter 135 goes low triggering a one-shot 139 whose output (PT4) is utilized to reset flip-flop 121 and flip-flop 133.

The turntable positioning circuit 43 comprises a flip-flop 141 which is triggered to the set position by the $\overline{RV}$ signal. A shaped $\overline{RF}$ signal from a flip-flop 143 is employed to reset flip-flop 141. Therefore the Q and $\overline{Q}$ outputs of the flip-flop 141 will vary at the turntable once around rate in synchronism with the $\overline{RF}$ signal. The Q and $\overline{Q}$ outputs of flip-flop 141 are applied to respective terminals of a bistable multivibrator 145 also receiving the PT4 signal. The Q and $\overline{Q}$ outputs of flip-flop 141 are utilized to determine the state of bistable multivibrator 145 when it is triggered by the PT4 signal. In this manner, the $\overline{Q}$ output of flip-flop 145 will be a high DC potential when the PT4 signal lags the $\overline{RF}$ signal and a low DC potential (approximately zero) when it leads the $\overline{RF}$ signal. The $\overline{Q}$ output of flip-flop 145 is voltage converted and then applied, through an isolation stage, to drive the power amplifiers 31 through the electronic switch 45. A flip-flop 147, triggered on by the shaped $\overline{RF}$ signal and reset by the PT4 signal, provides an output (T) which is applied to the inhibit logic circuit 47.

Electronic switch 45 comprises an FET 149 which is rendered conductive upon the application, to associated drive circuitry 151, of a signal (TM) generated by the inhibit logic circuit 47, to be subsequently discussed, which signal is characterized by having a low potential (approximately zero).

Figure 5:
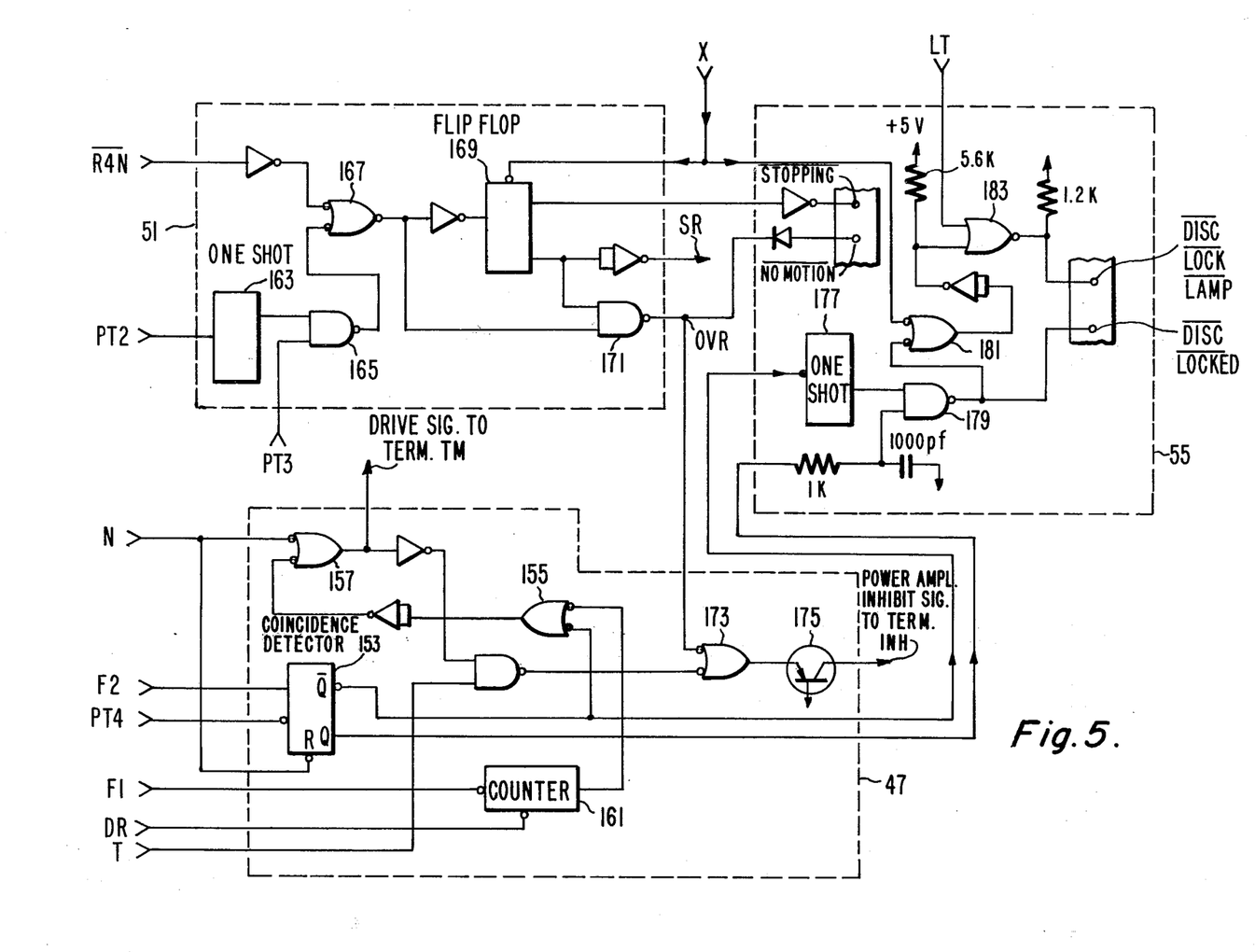

With reference to FIGS. 4 and 5, inhibit logic circuit 47 is shown to include a coincidence detector 153 which receives at respective input terminals thereof the shaped $\overline{RF}$ output (F2) of flip-flop 143 and the PT4 signal. Detector 153 triggers only on coincidence of the shaped $\overline{RF}$ signal and the PT4 signal and when triggered, produces an output having a pulse width slightly longer than a frame interval. Therefore, when the position control loop finally settles, coincidence occurs on every revolution of the turntable 13 retriggering the detector 153 and holding its Q output high. The $\overline{Q}$ output of the detector 153 is applied to one terminal of a first negated-input OR gate 155 whose output is applied to one terminal of a second negated-input OR gate 157, whose output is thus maintained high and therefore FET 149 is rendered non-conductive to prevent further positioning of the turntable 13.

The inverted output of gate 157 is applied to one input terminal of a NAND gate 159. The other input terminal of the gate 159 receives the output (T) of flip-flop 147 from the turntable positioning circuit 43. When coincidence is established between PT4 signal and $\overline{RF}$ signal the output of NAND gate 159 will be high.

Assuming now that the motor is rotating at operational speed (i.e., the output N of bypass circuit 49 is high) and that coincidence is not established between the PT4 signal and the $\overline{RF}$ signal. Therefore, the $\overline{Q}$ output of detector 153 will be high, enabling first gate 155. The other input to the first gate 155 is the high output of a divider of eight counter 161, enabled by the Q output DR of flip-flop 145 and is incremented by the $\overline{Q}$ output (shaped $\overline{RF}$) of flip-flop 143. As mentioned above, divider of eight counter 161 is incremented by the $\overline{RF}$ signal and therefore the output of counter 161 will become periodically high (i.e., the output will alternate between a high for the duration of eight pulses and a low for the duration of the succeeding eight pulses). The high output of counter 161, applied through first and second gates 155, 157, renders the FET 149 conductive. Periodically the output of counter 161 goes low thereby rendering FET 149 non-conductive to allow for periodic phasing and locking of the speed loop, thereby avoiding overshoot about the desired synchronized position by providing the equivalent of loop damping.

NAND gate 159 will also be enabled in the absence of coincidence between the PT4 signal and the $\overline{RF}$ signal, and the output (T) of flip-flop 147 applied therethrough is utilized to induce an inhibit condition in the power amplifiers 31, when the PT4 signal leads the $\overline{RF}$ signal in a manner to be subsequently discussed.

Command logic circuit 51 includes a one-shot 163 triggered by the PT2 signal and the output of which is applied to one input terminal of a NAND gate 165. The other input to the gate 165 being the inverted PT2 signal (PT3). The one-shot 163 output pulse width is set so that both inputs to the gate 165 go high at approximately 33% overspeed leading to a low output for the gate 165. This output, applied to one input terminal of a negated-input OR gate 167, results in a high output for gate 167. The inverted output of gate 167 is applied to trigger a flip-flop 169. Flip-flop 169 may also be triggered by a stopping command (RUN signal high) applied via an inverter to the other input terminal of gate 167. The $\overline{Q}$ output of flip-flop 169 is applied to one input terminal of NAND gate 171 which also receives at another input terminal thereof the output of gate 167. When either an overspeed condition or a stop command is sensed the $\overline{Q}$ output of the flip-flop 169 goes low thereby providing a high output for gate 171 which holds an external $\overline{\text{NO MOTION}}$ bus high.

The inverted $\overline{Q}$ output (SR) of flip-flop 169 is applied to relay 33 to control the energization thereof. Thus with SR high, the relay will be energized to a state where the motor input terminals are coupled to source of reverse potential to power down the motor.

Reset of flip-flops 169 and 115, to prevent reverse motor rotation, is by means of the one-shot 119 (no motion sensor) output X (in bypass circuit 49) changing from a high to a low. When flip-flop 115 is reset its Q output goes low and it results in a resetting of detector 153. Detector 153 is held in a reset state until the motor 15 is again up to speed. Resetting flip-flop 169 returns the relay 33 to its de-energized state.

Normally (i.e., no overspeed or stop command), the output of gate 171 is high so that a low output of gate 159 applied through gate 173, inhibits the power amplifiers 31 (this occurs when PT4 signal is leading the RF signal).

Bus circuit 55 includes a one-shot 177 which is triggered by the $\overline{Q}$ output of coincidence detector 153. The width of the output pulse of one-shot 177 is greater than the width of two video frames, and that output is applied to one input terminal of a NAND gate 179. The other input terminal of gate 179 receives the delayed Q output of coincidence detector 153 and the output of gate 179 produces a $\overline{\text{DISC LOCKED}}$ bus. An inverted-input OR gate 181 receives the output of gate 179 and the Q output (X) of one-shot 119 (from bypass circuit 49) at respective input terminals thereof. The inverted output of gate 181 is applied to one input terminal of a NOR gate 183 whose output drives a $\overline{\text{DISC LOCK LAMP}}$ bus coupled to an indicator lamp (not shown). The other input to NOR gate 183 being the lamp test signal from generator 57. The inverted Q output of the flip-flop 169 is applied to a $\overline{\text{STOPPING}}$ bus terminal (which may be utilized, for example, in a safety latch logic circuit). The output of NAND gate 171 (in command logic circuit 51) is applied through a blocking diode to a $\overline{\text{NO MOTION}}$ bus.

What is claimed is:

1. In a disc record player and recorder apparatus operable in either of an information recording or recovery mode for use with a source of frames of composite video signals including horizontal and vertical synchronization pulses and means for providing a frame synchronization signal; and apparatus comprising the combination:
    a turntable;
    means for rotating said turntable;
    means for synchronizing the speed of rotation of said turntable in response to synchronization pulses derived from said source;
    means, cooperating with said turntable; for providing a signal responsive to the rotation of the turntable;
    means, cooperating with said rotating means, for altering the phase of rotation of said turntable;
    first means for rendering said phase altering means responsive to the phase difference between said rotation responsive signal and said frame synchronization signal; and
    second means for rendering said phase altering means additionally responsive to the relative position of a predetermined sector of a disc, supported on said turntable, with respect to a predetermined sector of said turntable.

2. Apparatus as defined in claim 1 further comprising:
    means for rendering said speed synchronizing means responsive to the relative position of a predetermined sector of a disc, supported on said turntable, with respect to a predetermined sector of said turntable.

3. Apparatus as defined in claim 1 further comprising:
    third means for rendering said phase altering means additionally responsive to the mode of operation of said player and recorder apparatus.

4. Apparatus as defined in claim 1 further comprising means for periodically preventing said phase altering means from affecting said rotating means.

5. Apparatus as defined in claim 1 wherein said rotating means includes:
    a motor coupled to said turntable;
    means for generating a driving signal for said motor; and
    amplifying means coupling the output of said generating means to said motor; and
    wherein said phase altering means comprises:
    selectively enabled means for generating an additional driving signal for said motor,
    a signal path including an electronic switch coupling said additional signal generating means to said amplifying means, said signal path being completed when said switch is energized;
selectively enabled means for generating an inhibit signal; and
means for applying said inhibit signal to said amplifying means.

6. Apparatus as defined in claim 5 wherein said first rendering means comprises:
means for providing an indication of the phase relationship between said rotation responsive signal and said frame synchronization signal;
means, responsive to the output of said indication providing means, for sensing the phasing of the frame synchronization signal with respect to the rotation responsive signal; and
selectively disabled means, responsive to the output of said sensing means, for (1) enabling said inhibit signal generating means when said frame synchronization signal lags said rotation responsive signal and for (2) energizing said electronic switch and enabling said additional driving voltage generating means when said frame synchronization signal leads said rotation responsive signal.

7. Apparatus as defined in claim 6 wherein said first rendering means further comprises:
means for periodically disabling said selectively disabled means.

8. Apparatus as defined in claim 5 wherein said phase altering means includes:
means, responsive to a control signal, for subjecting said rotation responsive signal to a time delay which varies in response to variations in the control signal; and
wherein said second rendering means includes:
means for providing an indication of the relative position of the predetermined sector of a disc with respect to the predetermined sector of said turntable; and
means for generating said control signal in response to the output of said indication providing means.

9. In a disc player and recorder apparatus for use with a source of frames of video signals including horizontal and vertical synchronization signals; an apparatus comprising the combination:
a turntable;
a motor for driving said turntable;
tachometer means cooperating with said motor for providing a signal representative of the rotational speed of said motor;
a voltage controlled multivibrator;
first means for detecting the phase and frequency difference between the outputs of said tachometer means and said voltage controlled multivibrator;
means for generating a control voltage in response to long-term variations in the output of said first detecting means;
means for applying said control voltage to said voltage controlled multivibrator;
second means for detecting the frequency and phase differences between the output of said voltage controlled multivibrator and said horizontal synchronization signals;
means for deriving a motor driving voltage from the output of said second detecting means; and
means for applying said motor driving voltage to input terminals of said motor.

10. Apparatus as defined in claim 9 further comprising:
means, responsive to a control signal, for subjecting the output of said voltage controlled multivibrator to a time delay which varies in response to variations in the control signal;
means for providing an indication of the relative position of the predetermined sector of a partially recorded disc, supported on said turntable, with respect to the predetermined sector of said turntable; and
means for generating said control signal in response to the output of said indication providing means.

11. Apparatus as defined in claim 9 further comprising:
third means for detecting the excursion of the frequency difference between the output of said voltage controlled multivibrator and the output of said source of synchronization signals beyond a given threshold;
a flip-flop having a reset state triggered in response to the output of a source of signals representative of the rotation of said turntable; and a set state triggered in response to the output of said third detecting means; and
a signal path, including a threshold device, for coupling the output of said flip-flop to the output of said driving voltage deriving means.

12. In a disc record player and recorder apparatus operable in either of an information recording or recovery mode for use with a source of frames of composite video signals including horizontal and vertical synchronization pulses and means for providing a frame synchronization signal; an apparatus comprising the combination:
a turntable;
means for rotating said turntable;
means for synchronizing the speed of rotation of said turntable in response to synchronization pulses derived from said source;
means, cooperating with said turntable; for providing a signal responsive to the rotation of the turntable;
means, cooperating with said rotating means, for altering the phase of rotation of said turntable;
first means for rendering said phase altering means responsive to the phase difference between said rotation responsive signal and said frame synchronization signal;
first signal path coupling said frame synchronization providing means to said first rendering means;
second signal path coupling said rotation responsive means to said first rendering means;
delay means interposed in at least one of said first and second signal paths; and
means for varying the delay provided by said delay means in response to the relative position of a predetermined sector of a disc, supported on said turntable, with respect to a predetermined sector of said turntable.

13. Apparatus as defined in claim 2 further comprising:
means for rendering said speed synchronizing means responsive to the relative position of a predetermined sector of a disc, supported on said turntable, with respect to a predetermined sector of said turntable.

14. Apparatus as defined in claim 12 further comprising:

second means for rendering said phase altering means additionally responsive to the mode of operation of said player and recorder apparatus.

15. Apparatus as defined in claim 12 further comprising means for periodically preventing said phase altering means from affecting said rotating means.

16. In a disc record player and recorder apparatus operable in either of an information recording or recovery mode for use with a source of frames of information including means for providing a frame synchronization signal; an apparatus comprising the combination:
a turntable;
means for rotating said turntable;
means for controlling the frequency of rotation of said turntable;
means, cooperating with said turntable, for providing a signal responsive to the rotation of the turntable;
means, cooperating with said rotating means, for altering the phase of rotation of said turntable;
first means for rendering said phase altering means responsive to the phase difference between said rotation responsive signal and said frame synchronization signal; and
second means for rendering said phase altering means additionally responsive to the relative position of a predetermined sector of a disc, supported on said turntable, with respect to a predetermined sector of said turntable.

17. Apparatus as defined in claim 6 further comprising:
means for rendering said rotation frequency controlling means responsive to the relative position to a predetermined sector of a disc, supported on said turntable, with respect to a predetermined sector of said turntable.

18. Apparatus as defined in claim 16 further comprising means for periodically preventing said phase altering means from affecting said rotating means.

* * * * *

UNITED STATES PATENT AND TRADEMARK OFFICE
CERTIFICATE OF CORRECTION

PATENT NO. : 4,123,779

DATED : October 31, 1978

INVENTOR(S) : Arthur Marvin Goldschmidt

It is certified that error appears in the above-identified patent and that said Letters Patent is hereby corrected as shown below:

Column 9, line 38, change "RUN" to --$\overline{\text{RUN}}$--;

Column 12, line 26, "output", second occurrence, to -- input--;
(Claim 11)

Column 12, line 60, change "2" to --12--;
(Claim 13)

Column 14, line 10, change "6" to --16--.
(Claim 17)

Signed and Sealed this

Tenth Day of July 1979

[SEAL]

Attest:

*Attesting Officer*

LUTRELLE F. PARKER
*Acting Commissioner of Patents and Trademarks*